(12) United States Patent
Fukushima

(10) Patent No.: US 9,906,673 B2
(45) Date of Patent: Feb. 27, 2018

(54) IMAGE FORMING APPARATUS, CONTROL METHOD THEREOF AND STORAGE MEDIUM

(71) Applicant: CANON KABUSHIKI KAISHA, Tokyo (JP)

(72) Inventor: Michio Fukushima, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/332,126

(22) Filed: Oct. 24, 2016

(65) Prior Publication Data

US 2017/0041483 A1 Feb. 9, 2017

Related U.S. Application Data

(63) Continuation of application No. 14/847,217, filed on Sep. 8, 2015, now Pat. No. 9,501,016.

(30) Foreign Application Priority Data

Sep. 10, 2014 (JP) ................................ 2014-184538

(51) Int. Cl.
*H04N 1/00* (2006.01)
*G03G 15/00* (2006.01)
*G06F 1/32* (2006.01)

(52) U.S. Cl.
CPC ..... *H04N 1/00896* (2013.01); *G03G 15/5004* (2013.01); *G06F 1/3284* (2013.01); *H04N 1/00891* (2013.01); *G03G 15/80* (2013.01); *H04N 2201/0094* (2013.01)

(58) Field of Classification Search
None
See application file for complete search history.

(56) References Cited

U.S. PATENT DOCUMENTS

| 9,338,315 | B2 | 5/2016 | Ohara et al. |
| 2002/0089694 | A1 | 7/2002 | Idehara |
| 2012/0200874 | A1 | 8/2012 | Kohara et al. |
| 2014/0002844 | A1* | 1/2014 | Miyamoto ......... G06K 15/4055 358/1.13 |
| 2015/0002877 | A1 | 1/2015 | Ono et al. |

FOREIGN PATENT DOCUMENTS

JP 2012-114499 A 6/2012

* cited by examiner

*Primary Examiner* — Clayton E Laballe
*Assistant Examiner* — Jas Sanghera
(74) *Attorney, Agent, or Firm* — Carter, DeLuca, Farrell & Schmidt, LLP

(57) ABSTRACT

The distance between an image forming apparatus and an object located around the apparatus is detected, and the apparatus is returned from a power-saving state when the distance becomes shorter than a predetermined distance. Also, the image forming apparatus is returned from a power saving state, even if the distance is longer than the predetermined distance, in a case where the detected distance decreases for every predetermined time.

19 Claims, 15 Drawing Sheets

FIG. 1
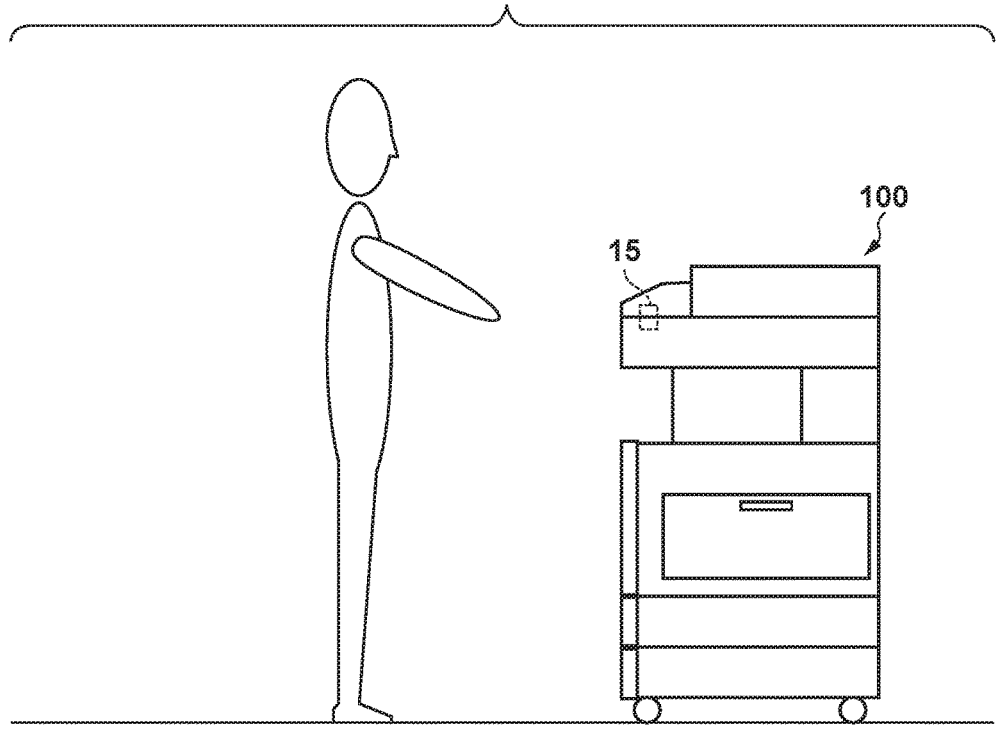
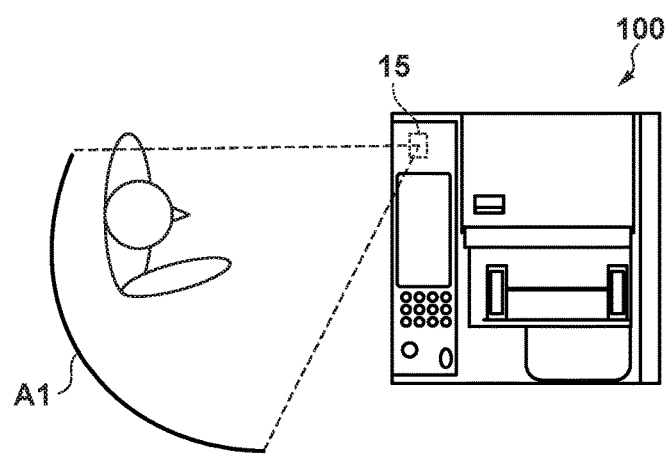

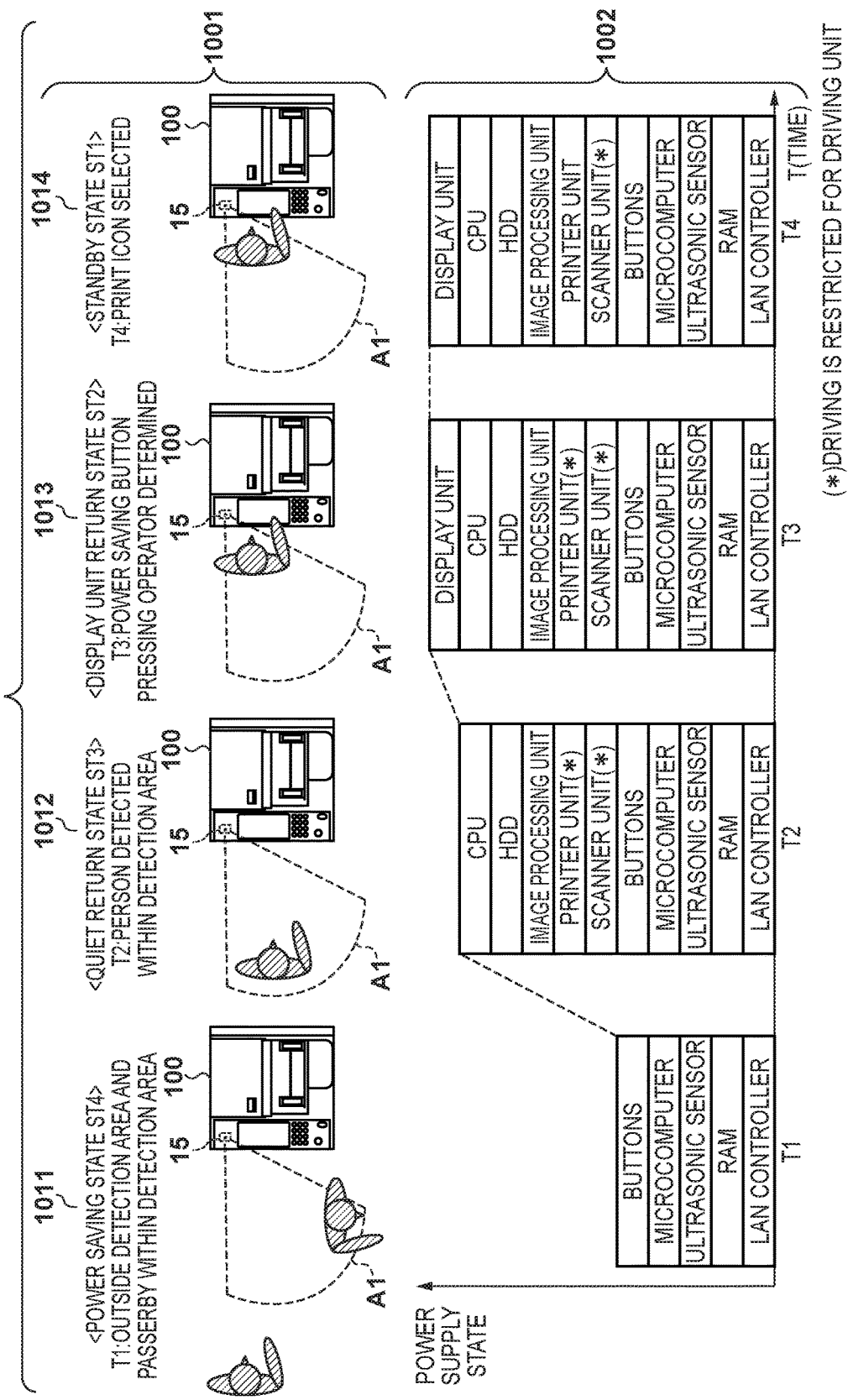

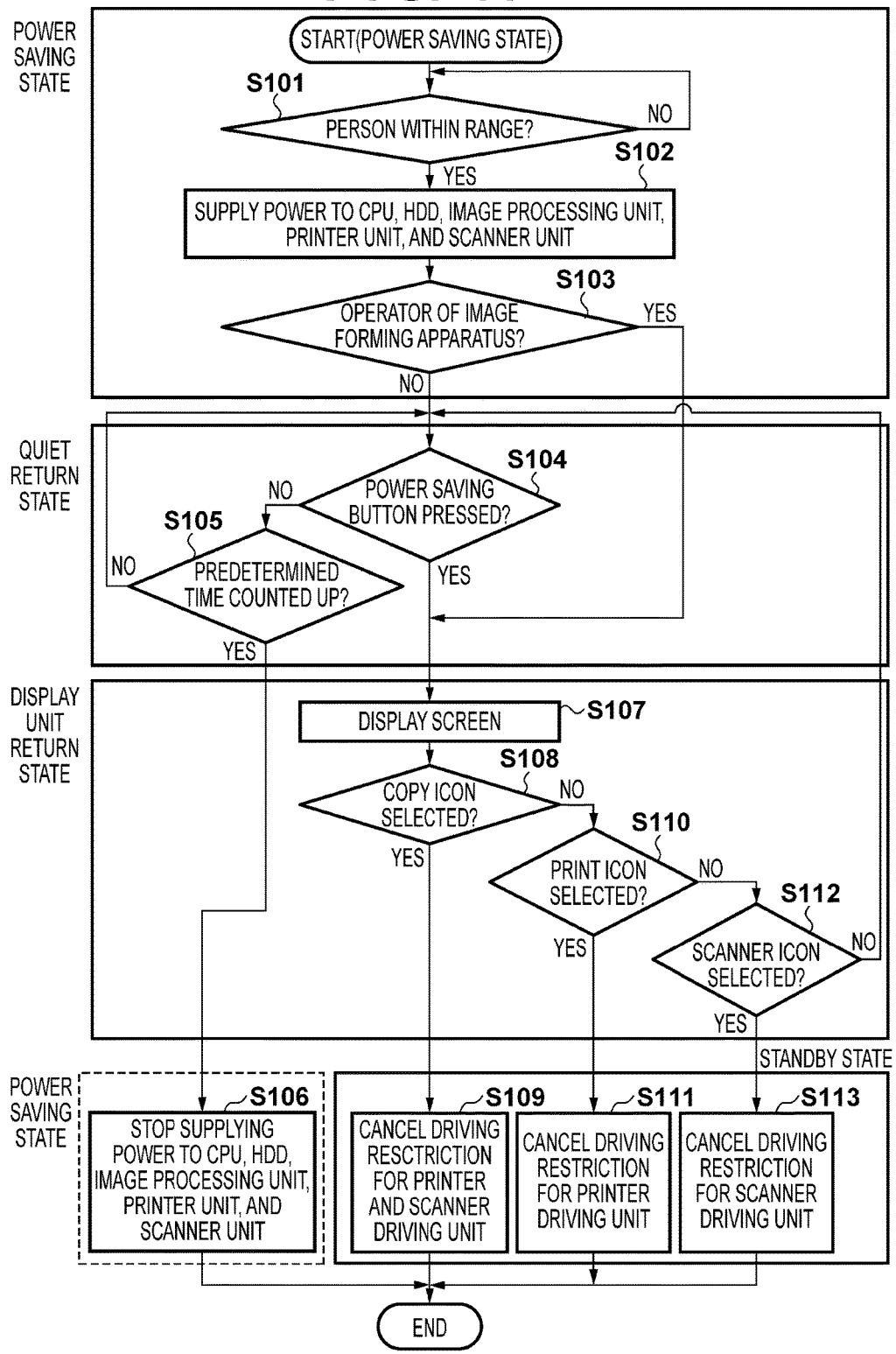

FIG. 12A

<Case:1>

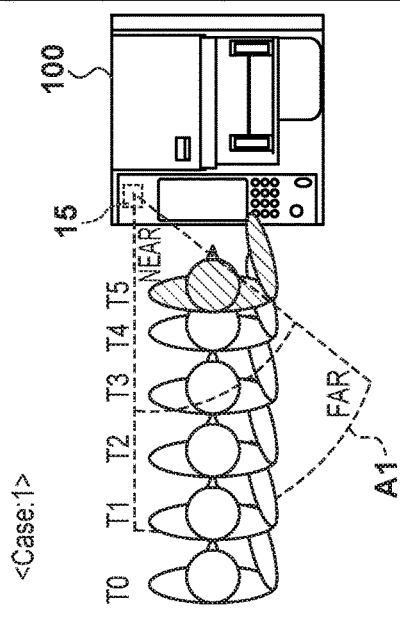

| Time | MEASURED VALUE | DISTANCE | INCREASE/ DECREASE | DETERMINATION |
|---|---|---|---|---|
| T0 | NOT MEASURABLE | OUTSIDE OF RANGE | — | NO RESPONSE |
| T1 | 114cm | WITHIN RANGE: FAR | NEW | RESPONSE |
| T2 | 96cm | WITHIN RANGE: FAR | DECREASE | PERSON DETECTED |
| T3 | 74cm | WITHIN RANGE: NEAR | DECREASE | RESPONSE |
| T4 | 52cm | WITHIN RANGE: NEAR | DECREASE | OPERATOR |
| T5 | 33cm | WITHIN RANGE: NEAR | DECREASE | RESPONSE |

FIG. 12B

<Case:2>

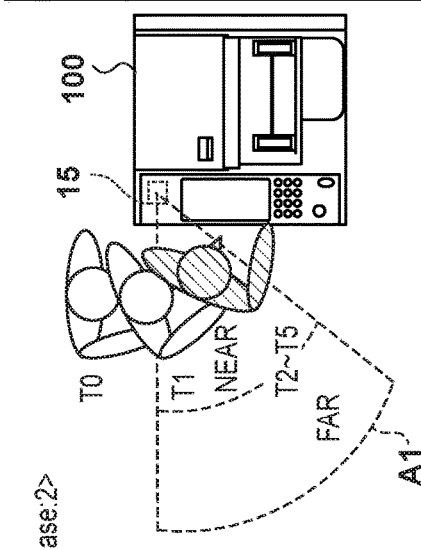

| Time | MEASURED VALUE | DISTANCE | INCREASE/ DECREASE | DETERMINATION |
|---|---|---|---|---|
| T0 | NOT MEASURABLE | OUTSIDE OF RANGE | — | NO RESPONSE |
| T1 | 41cm | WITHIN RANGE: NEAR | NEW | RESPONSE |
| T2 | 35cm | WITHIN RANGE: NEAR | DECREASE | PERSON DETECTED |
| T3 | 29cm | WITHIN RANGE: NEAR | — | RESPONSE |
| T4 | 30cm | WITHIN RANGE: NEAR | — | RESPONSE |
| T5 | 33cm | WITHIN RANGE: NEAR | — | OPERATOR |

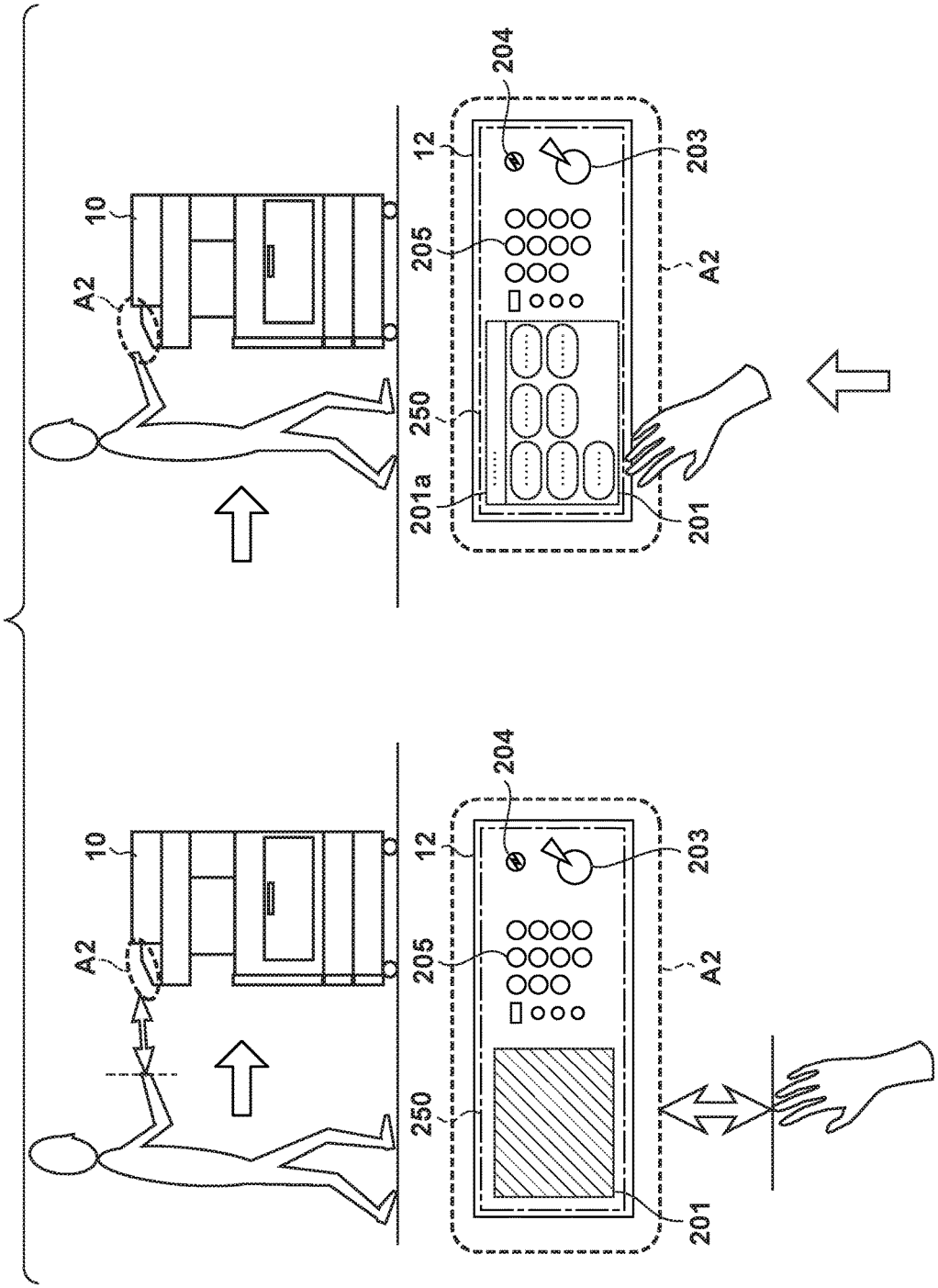

IMAGE FORMING APPARATUS, CONTROL METHOD THEREOF AND STORAGE MEDIUM

CROSS REFERENCE TO RELATED APPLICATIONS

This application is a continuation of U.S. patent application Ser. No. 14/847,217, filed Sep. 8, 2015, which claims the benefit and priority from Japanese Patent Application No. 2014-184538, filed Sep. 10, 2014, the disclosures of each of which are hereby incorporated by reference herein in their entirety.

BACKGROUND OF THE INVENTION

Field of the Invention

The present invention relates to an image forming apparatus including a sensor that detects a person who comes close to the image forming apparatus, a control method thereof, and a storage medium.

Description of the Related Art

Among current image forming apparatuses, there is an image forming apparatus that is returned from a power saving state when a person is detected in front of the apparatus by a sensor, and performs control to reduce the return time felt by the user. However, such a sensor can detect a passerby simply passing in front of the apparatus and can erroneously return the apparatus from a power saving state. Japanese Patent Laid-Open No. 2012-114499 proposes a technique in which, after the sensor provided in the image forming apparatus detects a person coming close to the apparatus, the sensor causes the image forming apparatus to return from a power saving state by determining that the person has stopped in front of the image forming apparatus. More specifically, it proposes a technique of returning the image forming apparatus from the power saving state by determining that a person has stopped in front of the image forming apparatus when a pyroelectric sensor capable of detecting human motion cannot detect the person anymore.

The above-described related art, however, has a problem as described below. For example, in the related art, an operator in front of the apparatus must wait there until the image forming apparatus is returned from the power saving state since the image forming apparatus is returned from the power saving state after it is determined that the operator of image forming apparatus has stopped in front of the apparatus. The return time, in this case, is no different from the return time of a case in which the image forming apparatus is returned from the power saving state after the user has operated an operation panel or the like. Thus, the full effect of returning the image forming apparatus from a power saving state in advance by detecting a person with a sensor cannot be obtained.

SUMMARY OF THE INVENTION

The present invention enables realization of a mechanism for detecting a person in front of an apparatus and controlling whether to return from a power saving state by suitably determining whether the detected person is an operator of the apparatus.

One aspect of the present invention provides an image forming apparatus comprising: a detection unit configured to detect a distance between the image forming apparatus and an object located around the image forming apparatus; and a control unit configured to return the image forming apparatus from a power saving state when the distance detected by the detection unit is shorter than a predetermined distance; wherein the control unit returns the image forming apparatus from the power saving state, even if the distance detected by the detection unit is longer than the predetermined distance, in a case where the distance detected by the detection unit decreases every predetermined time.

Another aspect of the present invention provides a control method for an image forming apparatus, comprising: detecting a distance between the image forming apparatus and an object located around the image forming apparatus; and controlling to return the image forming apparatus from a power saving state when the distance detected in the detecting is shorter than a predetermined distance; wherein in the controlling, the image forming apparatus is returned from the power saving state, even if the distance detected in the detecting is longer than the predetermined distance, in a case where the distance detected in the detecting decreases every predetermined time.

Still another aspect of the present invention provides a non-transitory computer-readable storage medium storing a computer program for causing a computer to execute each step of a control method for an image forming apparatus, detecting a distance between the image forming apparatus and an object located around the image forming apparatus; and controlling to return the image forming apparatus from a power saving state when the distance detected in the detecting is shorter than a predetermined distance; wherein in the controlling, the image forming apparatus is returned from the power saving state, even if the distance detected in the detecting is longer than the predetermined distance, in a case where the distance detected in the detecting decreases every predetermined time.

Further features of the present invention will be apparent from the following description of exemplary embodiments with reference to the attached drawings.

BRIEF DESCRIPTION OF THE DRAWINGS

FIG. 1 shows views of the outer appearance of an image forming apparatus according to the first embodiment;

FIG. 10 shows views for explaining the power control transition according to a distance between an operator and the image forming apparatus according to the first embodiment;

FIG. 11 is a flowchart showing the power control sequence of the image forming apparatus according to the first embodiment;

FIGS. 12A to 12D show views for explaining the determination of the image forming apparatus according to the distance between the operator and the image forming apparatus according to the first embodiment;

FIG. 14 is a view showing a person putting a hand over an operation unit of an image forming apparatus according to the second embodiment.

DESCRIPTION OF THE EMBODIMENTS

Figure 2:
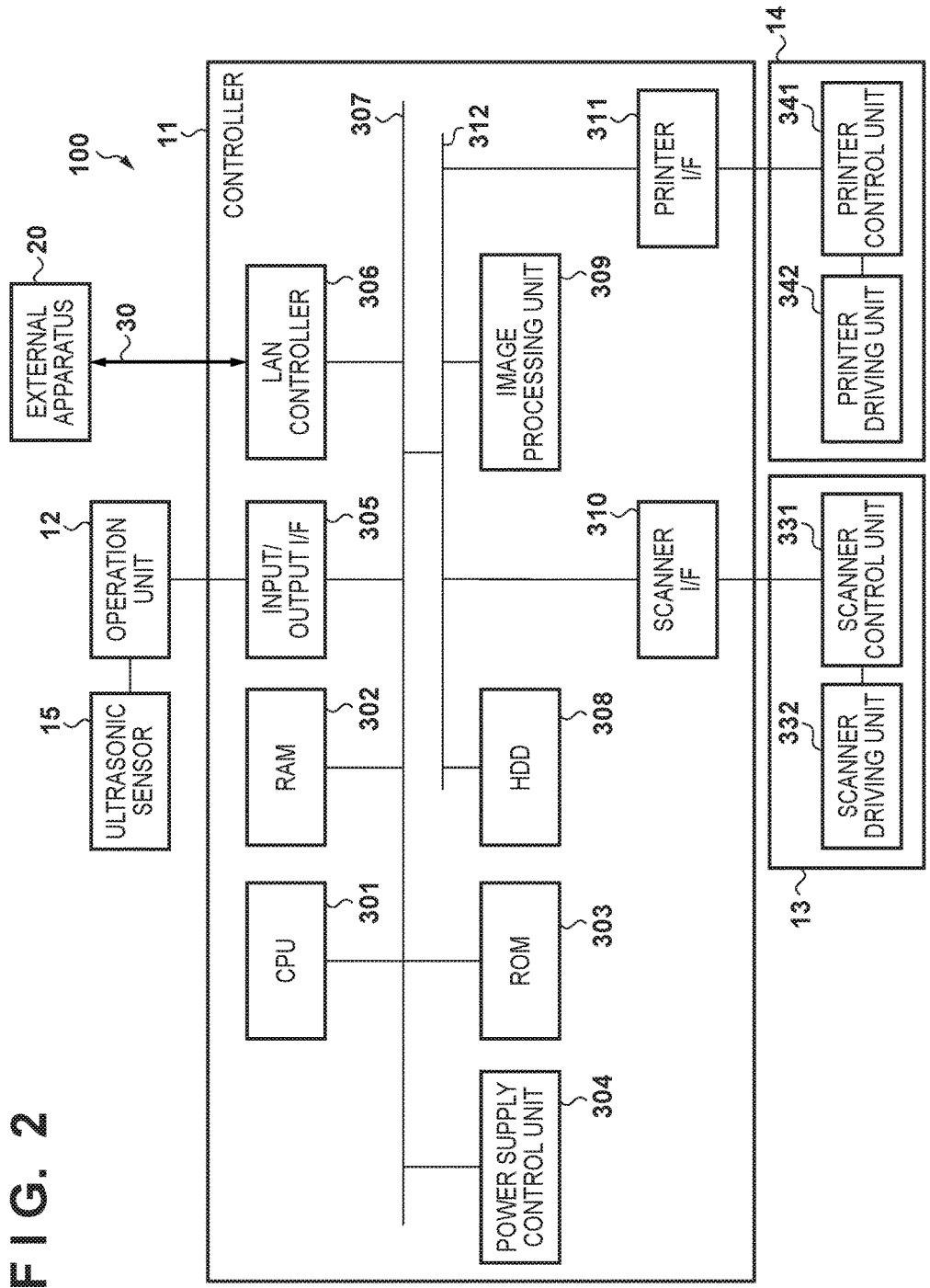
FIG. 2 is a hardware block diagram of the image forming apparatus according to the first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Arrangement of Image Forming Apparatus

The first embodiment of the present invention will be described below with reference to FIGS. 1 to 13. First, the outer appearance of an image forming apparatus 100 according to the embodiment will be described with reference to FIG. 1.

The image forming apparatus 100 is an MFP (Multifunction Peripheral) which provides a plurality of functions such as a print function, a scanner function, a copy function, and a FAX function. The image forming apparatus 100 includes an ultrasonic sensor 15 for detecting a person who comes close to the image forming apparatus 100. This embodiment will describe an example, as shown in FIG. 1, in which the ultrasonic sensor 15 is provided on an operation unit of the image forming apparatus. However, the present invention is not limited to this. The ultrasonic sensor 15 can be provided anywhere as long as the sensor is located where it can detect an object around the image forming apparatus 100. When the ultrasonic sensor 15 detects that a person has come close to the image forming apparatus 100, the image forming apparatus 100 is returned to a standby state, which allows any of the above functions to be used, from a power saving state which consumes less power than the standby state.

By outputting a 40-kHz pulse wave in an inaudible frequency range and receiving a reflected wave of the pulse wave reflected by an object (a person or the like), the ultrasonic sensor 15 can detect the object located around the image forming apparatus. Based on the time taken to receive the reflected wave since the output of the pulse wave, the ultrasonic sensor 15 measures the distance between the object and the image forming apparatus 100. The measurement is conducted for every predetermined time, and the transition of the distance between the image forming apparatus 100 and the object can be checked every predetermined time. Note that while a case in which the ultrasonic sensor 15 is used has been exemplified, as long as it is a sensor capable of detecting a person, the sensor may be an infrared receiving sensor which receives infrared rays emitted from a person. Additionally, instead of the ultrasonic sensor 15, a capacitance sensor which measures the distance between the sensor and a target object based on the capacitance between the sensor and the target object may be used. Further, instead of the ultrasonic sensor 15, an infrared array sensor having infrared receiving units arranged in a line or a matrix may be used. The ultrasonic sensor 15 also has a fan-shaped detection range A1. Note that in order to detect a person without being influenced by an obstacle such as a computer placed on a desk, the ultrasonic sensor 15 may be arranged so that the output direction of the pulse wave becomes upward.

The control arrangement of the image forming apparatus 100 will be described next with reference to FIG. 2. The image forming apparatus 100 includes a controller 11, an operation unit 12, a scanner unit 13, a printer unit 14, and the ultrasonic sensor 15.

The controller 11 is communicably connected to the operation unit 12, the scanner unit 13, and the printer unit 14. The controller 11 includes a CPU 301, a RAM 302, a ROM 303, a power supply control unit 304, an input/output I/F 305, and a LAN controller 306. The CPU 301, the RAM 302, the ROM 303, the power supply control unit 304, the input/output I/F 305, and the LAN controller 306 are connected to a system bus 307. Additionally, the controller 11 includes an HDD 308, an image processing unit 309, a scanner I/F 310, and a printer I/F 311. The HDD 308, the image processing unit 309, the scanner I/F 310, and the printer I/F 311 are connected to an image bus 312.

As well as collectively controlling the access of each connected device based on a control program or the like stored in the ROM 303, the CPU 301 collectively controls each processing to be executed in the controller 11. The RAM 302 is a system work memory for operating the CPU 301. This RAM 302 is also a memory for temporarily storing image data. A boot program of the apparatus and the like are stored in the ROM 303.

The power supply control unit 304 controls the power supply to each unit of the image forming apparatus 100. Details of the power supply control unit 304 will be described later. The input/output I/F 305 is an interface unit to connect the system bus 307 and the operation unit 12. This input/output I/F 305 receives image data to be displayed on the operation unit 12 from the system bus 307 and outputs the data to the operation unit 12. The image input/output I/F 305 outputs, to the system bus 307, information input from the operation unit 12. The LAN controller 306 exchanges information with an external apparatus 20 connected to a network 30.

The HDD 308 is a hard disk drive and stores system software and image data. The image processing unit 309 reads out image data stored in the RAM 302 and performs image processing such as color adjustment, enlargement or reduction such as JPEG or JBIG. The image data is data such as an image read by the scanner unit 13, an image to be printed by the printer unit 14, or an image received from an external apparatus 20. The scanner I/F 310 is an interface unit to communicate with a scanner control unit 331 of the scanner unit 13. The printer I/F 311 is an interface unit to communicate with a printer control unit 341 of the printer unit 14. The image bus 312 is a transmission line for exchanging image data and is configured by a bus such as a PCI bus or an IEEE1394.

The scanner unit 13 optically reads an image from an original and generates image data. The scanner unit includes the scanner control unit 331 and a scanner driving unit 332. The scanner driving unit 332 includes a driving unit for moving the reading head which reads an original and a driving unit for conveying the original to the reading position. The scanner control unit 331 controls the operation of the scanner driving unit 332. The scanner control unit 331 receives setting information set by an user to perform scanning by communicating with the CPU 301 and controls the operation of the scanner driving unit 332 based on the setting information.

The printer unit 14 forms an image on a print medium (print sheet) in accordance with an electrophotography method. This printer unit 14 includes the printer control unit 341 and a printer driving unit 342. The printer driving unit 342 includes a motor to rotate a photosensitive drum, a mechanism unit for pressurizing a fixing unit, and a heater. The printer control unit 341 controls the operation of the printer driving unit 342. The printer control unit 341 receives setting information set by an user to perform printing by communicating with the CPU 301 and controls the operation of the printer driving unit 342 based on the setting information.

<Power Supply Circuit>

Figure 3:
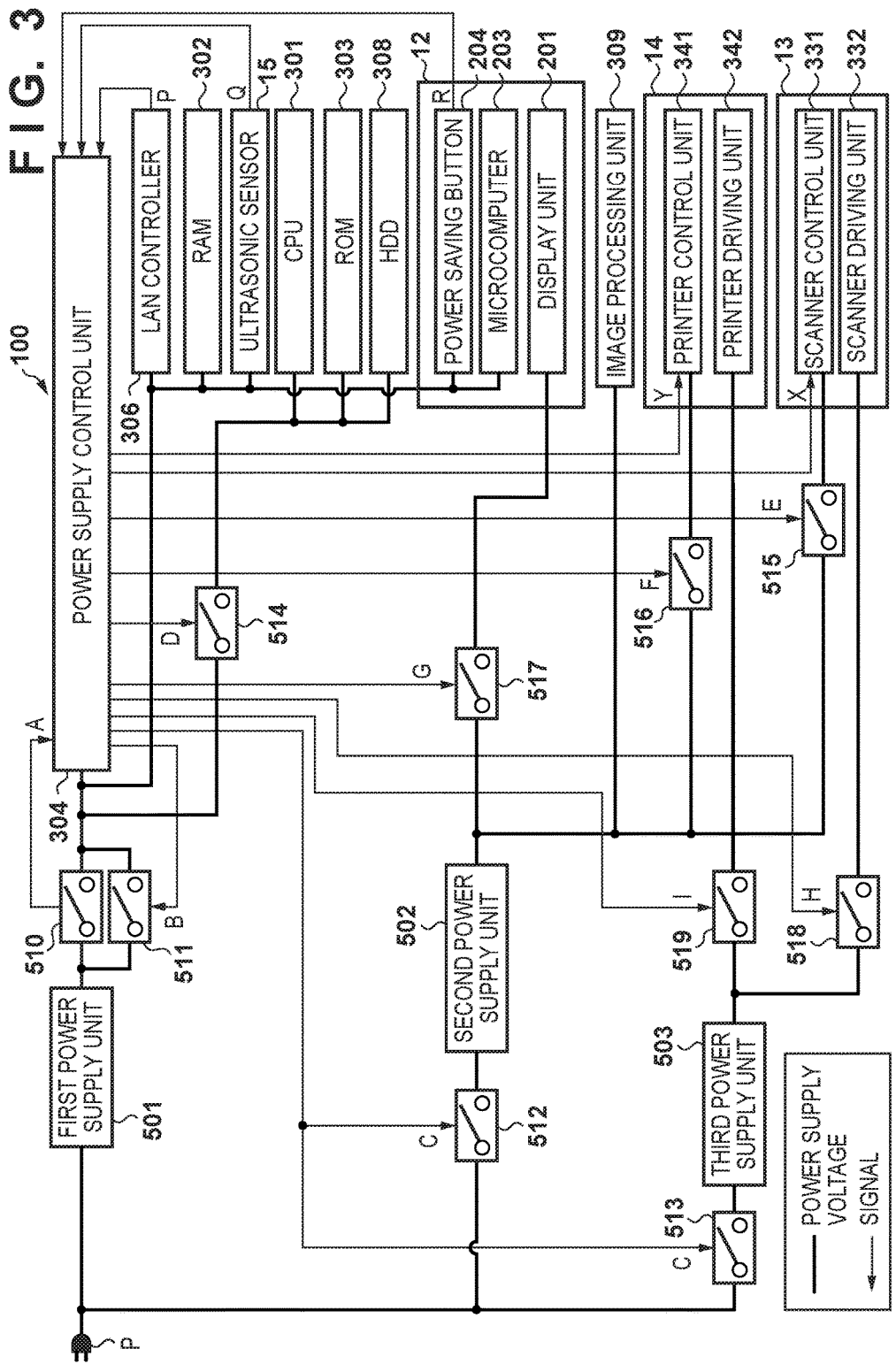
FIG. 3 is a diagram of a power supply circuit of the image forming apparatus according to the first embodiment.

The arrangement of a power supply circuit of the image forming apparatus 100 will be described next with reference to FIG. 3. The image forming apparatus 100 includes a first power supply unit 501, a second power supply unit 502, and a third power supply unit 503.

The first power supply unit 501 generates a DC power supply voltage of about 5.0 V from an AC power supply voltage supplied via a plug P. The first power supply unit 501 supplies the generated DC power supply voltage to the LAN controller 306, the RAM 302, the ultrasonic sensor 15, the CPU 301, the ROM 303, the HDD 308, and to a power saving button 204 and a microcomputer 203 of the operation unit 12. The devices that receive a power supply voltage from the first power supply unit 501 will be referred to as first power supply system devices hereinafter.

The second power supply unit 502 generates a DC power supply voltage of about 12.0 V from the AC power supply voltage supplied via the plug P. The second power supply unit 502 supplies the generated DC power supply voltage to a display unit 201, the image processing unit 309, the printer control unit 341, and the scanner control unit 331. The devices that receive a power supply voltage from the second power supply unit 502 will be referred to as second power supply system devices hereinafter.

The third power supply unit 503 generates a DC power supply voltage of about 24.0 V from the AC power supply voltage supplied via the plug P. The third power supply unit 503 supplies the generated DC power supply voltage to the printer driving unit 342 and the scanner driving unit 332. The devices that receive a power supply voltage from the third power supply unit 503 will be referred to as third power supply system devices hereinafter.

A seesaw switch 510 which is turned on and off according to the operation by the user is arranged between the first power supply unit 501 and the first power supply system devices. Additionally, a relay switch 511 is arranged in parallel with the seesaw switch 510 to supply power generated by the first power supply unit 501 to the first power supply system devices. Even when the seesaw switch 510 is turned off by the operation of the user, if the relay switch 511 is ON, power is supplied from the first power supply unit 501 to the first power system devices via the relay switch 511. The power supply control unit 304 is notified, via a signal A, about the seesaw switch 510 being turned off. When the seesaw switch 510 is turned off, the power supply control unit 304 instructs the CPU 301 to execute shutdown processing. When the shutdown processing is executed by the CPU 301, the power supply control unit 304 turns off the relay switch 511. Thus, the image forming apparatus 100 is completely turned off.

A relay switch 512 which switches between supplying power and interrupting the supply of power from the plug P to the second power supply unit is arranged between the plug P and the second power supply unit 502. A relay switch 513 which switches between supplying power and interrupting the supply of power from the plug P to the third power supply unit 503 is arranged between the plug P and the third power supply unit 503.

A switch 514 which switches between supplying power and stopping the supply of power to the CPU 301, the ROM 303, and the HDD 308 is arranged between the first power supply unit 501 and the CPU 301, the ROM 303, and the HDD 308. A switch 515 which switches between supplying power and stopping the supply of power to the scanner control unit 331 is arranged between the scanner control unit 331 and the second power supply unit 502. A switch 516 which switches between supplying power and stopping the supply of power to the printer control unit 341 is arranged between the printer control unit 341 and the second power supply unit 502. A switch 517 which switches between supplying power and stopping the supply of power to the display unit 201 is arranged between the display unit 201 of the operation unit 12 and the second power supply unit 502.

Additionally, a switch 518 which switches between supplying power and stopping the supply of power to the scanner driving unit 332 is arranged between the scanner driving unit 332 and the third power supply unit 503. A switch 519 which switches between supplying power and stopping the supply of power to the printer driving unit 342 is arranged between the printer driving unit 342 and the third power supply unit 503. Note that each of the switches 511 to 519 may be configured by an FET switch.

Next, the details of the power supply control unit 304 will be described. The power supply control unit 304 is a programmable logic circuit capable of rewriting a circuit. The power supply control unit 304 of the embodiment is a CPLD (Complex Programmable Logic Device). The power supply control unit 304 detects a return factor for returning the image forming apparatus 100 from a power saving state ST4 and performs power control in accordance with the detected return factor. The return factor includes the following factors: the seesaw switch 510 is turned on from OFF (a signal A), a specific packet (for example, a print job) is received from the external apparatus 20 (a signal P), a person comes close to the image forming apparatus 100 (a signal Q), and the power saving button 204 is pressed (operated) by the user (a signal R).

The signals A, P, Q, and R indicating the above return factors are input to the power supply control unit 304. The signal A indicates the state (on/off) of the seesaw switch 510, and is output from the seesaw switch 510. The signal P indicates that the LAN controller 306 has received a specific packet (a print job or the like) from the external apparatus 20, and is output from the LAN controller 306. The signal Q indicates that the ultrasonic sensor 15 has detected an object such as a person, and is output from the ultrasonic sensor 15. The signal R indicates that the power saving button 204 of the operation unit 12 has been pressed by the user, and is output from the power saving button 204.

The power supply control unit 304 also outputs signals B, C, E, F, G, H, I (controls the logic levels of the signals B, C, E, F, G, H, I). The signal B switches on and off the relay switch 511. The signal C respectively switches on and off the relay switches 512 and 513. The signal D switches on and off the switch 514. The signal E switches on and off the switch 515. The signal F switches on and off the switch 516. The signal G switches on and off the switch 517. The signal H switches on and off the switch 518. The signal I switches on and off the switch 519.

When the seesaw switch 510 is turned off by the operation of the user, the logic of the signal A is set at low level. When the logic of the signal A is set at low level, the power supply control unit 304 instructs the CPU 301 to shut down the image forming apparatus 100. The CPU 301 executes the shutdown processing in accordance with the instruction. The power supply control unit 304 also controls the signals B and C to turn off the relay switches 511, 512 and 513. Thus, the image forming apparatus 100 is appropriately turned off after the shutdown processing.

When the LAN controller 306 receives a specific packet (a print job) from the external apparatus 20, the logic of the signal P changes to high level. When the logic of the signal P is set at high level, the power supply control unit 304 controls the signals C, D, F, and I to turn on the relay switches 512, 513, 514, 516, and 519. Thus, printing based on the print job is executed by the printer unit 14.

When the ultrasonic sensor 15 detects an object such as a person, the logic of the signal Q changes to high level. When the logic of the signal Q is set at high level, the power supply control unit 304 controls the signals C, D, E, F, H, and I to turn on the switches 512 to 516, 518, and 519. Additionally, when the ultrasonic sensor 15 detects an object such as a person, the power supply control unit 304 sets the logic of signals Y and X at high level. Further, when the ultrasonic sensor 15 detects a person, the display unit 201 lights up.

The signal X is a signal for the scanner control unit 331 to switch between activation by driving the scanner driving unit 332 or activation without driving the scanner driving unit 332. When the logic of the signal X is set at high level while power is supplied to the scanner control unit 331, the scanner control unit 331 keeps the scanner driving unit 332 stopped and activates the scanner unit 13 (to be referred to as quiet activation of the scanner unit 13 hereinafter). When the logic of signal X is set at low level while power is supplied to the scanner control unit 331, the scanner control unit 331 drives the scanner driving unit 332 and activates the scanner unit 13.

The signal Y is a signal for the printer control unit 341 to switch between activation by driving the printer driving unit 342 or activation without driving the printer driving unit 342. If the logic of the signal Y is set at high level when power is supplied to the printer control unit 341, the printer control unit 341 keeps the printer driving unit 342 stopped and activates the printer unit 14 (to be referred to as quiet activation of the printer unit 14 hereinafter). When the logic of signal Y is set at low level when power is supplied to the printer control unit 341, the printer control unit 341 drives the printer driving unit 342 and activates the printer unit 14.

When the power saving button 204 is pressed by the user, the logic of the signal R changes to high level. When the logic of the signal R is set at high level, the power supply control unit 304 controls the signals C to I and turns on the relay switches 512 to 519. When the power saving button 204 is pressed, the power supply control unit 304 sets the logic of the signal Y and X at high level. When the power saving button 204 is pressed, the display unit 201 lights up.

<State Transition>

Figure 4:
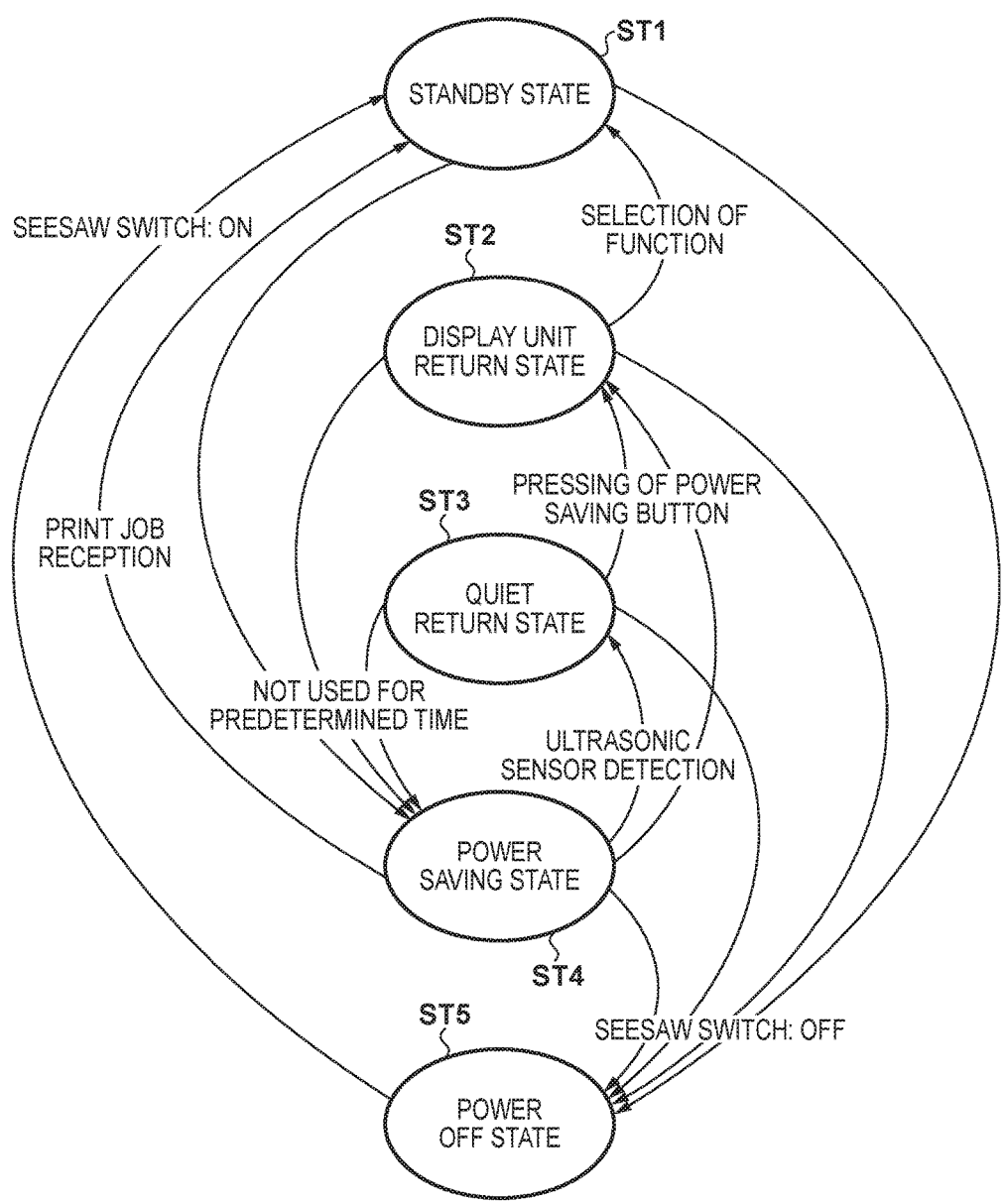
FIG. 4 is a view showing the state transition of the image forming apparatus according to the first embodiment.

The state transition of the image forming apparatus 100 will be described next with reference to FIG. 4. The image forming apparatus 100 has operation states of a standby state ST1, a display unit return state ST2, a quiet return state ST3, a power saving state ST4, and a power off state ST5.

The standby state ST1 is a normal operation state in which it is possible to execute the reading operation by the scanner unit 13 and the printing operation by the printer unit 14. In the standby state ST1, when the image forming apparatus 100 is not used for a predetermined time, for example, the operation unit 12 is not operated for a predetermined time and a job is not received from the external apparatus 20, the image forming apparatus 100 shifts from the standby state ST1 to the power saving state ST4.

The power saving state ST4 is a state which consumes less power than the standby state ST1. In the power saving state ST4, power is supplied only to devices (the ultrasonic sensor 15, the LAN controller 306, and the like) necessary for returning the image forming apparatus from the power saving state ST4. In the power saving state ST4, when the ultrasonic sensor 15 detects a person, the image forming apparatus 100 shifts to the quiet return state ST3 or the display unit return state ST2 in accordance with the detection result. Whether the image forming apparatus 100 transits to the quiet return state ST3 or the display unit return state ST2 is determined based on the transition of the distance between the image forming apparatus 100 and the detection target detected by the ultrasonic sensor 15 for every predetermined time. The CPU 301 of the controller 11, the image processing unit 309, the HDD 308, the scanner unit 13, and the printer unit 14 are activated in the quiet return state ST3. Note that the printer control unit 341 and the scanner control unit 331 respectively restrict driving the printer driving unit 342 and the scanner driving unit 332. This causes the image forming apparatus 100 to activate quietly. From the above activation, the CPU 301, the image processing unit (ASIC) 309, the CPU of the scanner control unit 331, and the CPU of the printer control unit 341 perform initialization.

Additionally, in the power saving state ST4, when a print job is received from the external apparatus 20 to execute printing in the printer unit 14, the image forming apparatus 100 shifts to the standby state ST1. Note that if the user presses the power saving button 204 in the power saving state ST4, the image forming apparatus 100 shifts to the display return state ST2. In this embodiment, since the user is supposed to be detected by the ultrasonic sensor 15 before the power saving button 204 is pressed, it is assumed in the power saving state ST4 that the power saving button 204 will not be pressed.

When the power saving button 204 is pressed in the quiet return state ST3, the image forming apparatus 100 shifts to the display unit return state ST2 in which the display unit 201 lights up. This allows the user to select a function provided by the image forming apparatus 100 via a main menu screen (a selection screen) 201*a* displayed by the display unit 201. Details of the main menu screen (the selection screen) 201*a* will be described later with reference to FIG. 9.

When a function to be provided by the image forming apparatus 100 is selected via the main menu screen 201*a* displayed during the display unit return state ST2, the image forming apparatus 100 shifts to the standby state ST1 in which the selected function can be executed. For example, when the print function is selected via the main menu screen 201*a*, the driving restriction on the printer driving unit 342 is canceled, and the printer driving unit 342 is driven. Also, when the scanner function is selected via the main menu screen 201*a*, the driving restriction on the scanner driving unit 332 is canceled and the scanner driving unit 332 is driven.

Additionally, when the seesaw switch 510 is turned off from ON by the operation of the user, the image forming apparatus 100 shifts to the power off state.

Figure 5:
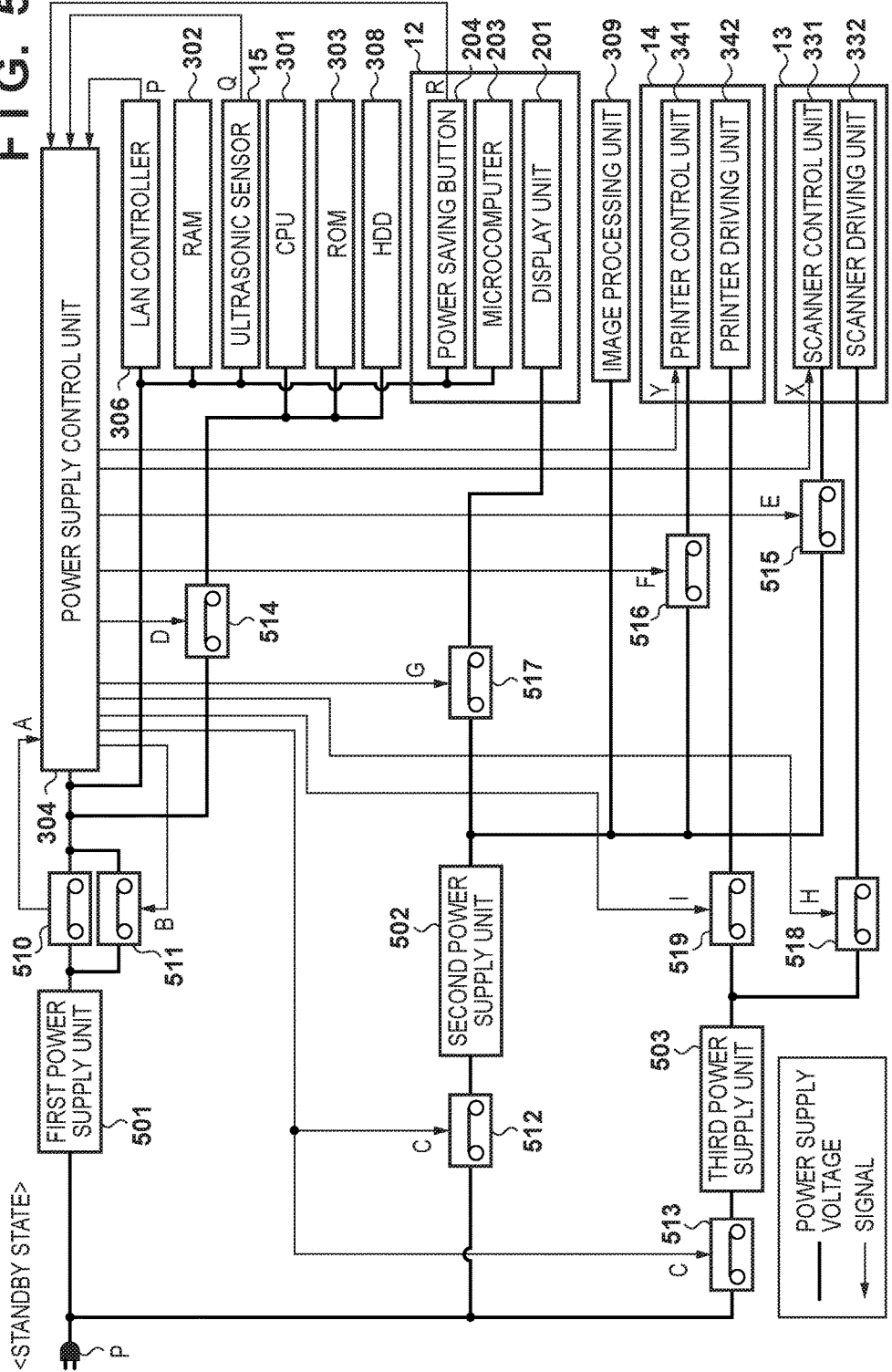
FIG. 5 is a diagram showing the standby state of the image forming apparatus according to the first embodiment.

The control of power delivered to each load included in the image forming apparatus 100 in the aforementioned states will be described next with reference to FIGS. 5 to 8. FIG. 5 shows power control in the standby state ST1. As shown in FIG. 5, in the standby state ST1, the switches 510 to 519 of the image forming apparatus 100 are turned on, and power is supplied to each unit of the image forming apparatus 100.

Figure 6:
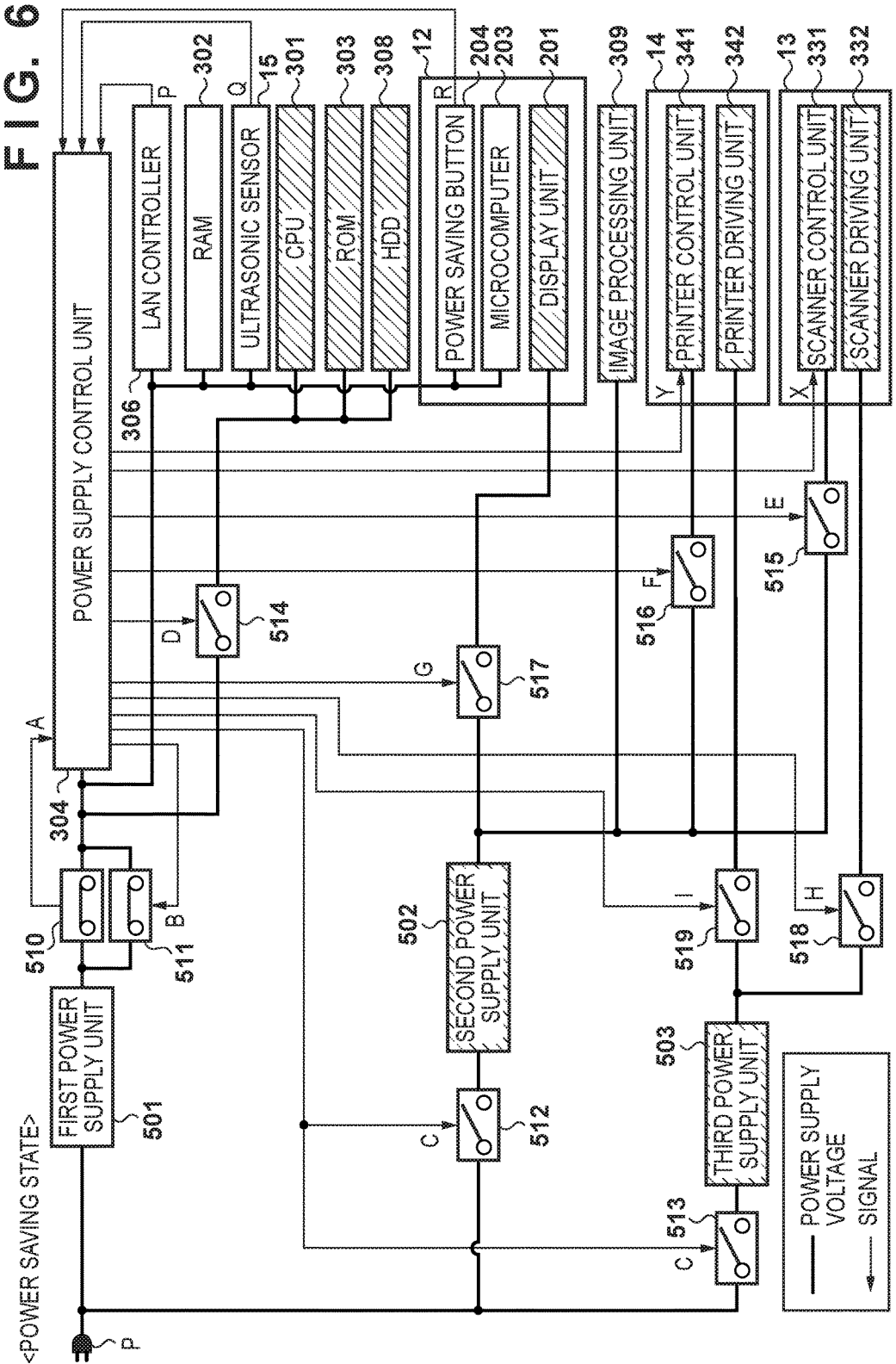
FIG. 6 is a diagram showing the power saving state of the image forming apparatus according to the first embodiment.

FIG. 6 shows power control in the power saving state ST4. As shown in FIG. 6, in the power saving state ST4, power is supplied to only some of the first power supply system devices. In the power saving state ST4, the relay switch 511 for supplying power generated by the first power supply unit 501 is turned on, but the other switches 512 to 519 are turned off. Thus, power is supplied to the power supply control unit 304, the RAM 302, the LAN controller 306, the ultrasonic sensor 15, the power saving button 204, and the microcomputer 203 in the power saving state ST4. Note that power may be supplied to the microcomputer 203 when the ultrasonic sensor 15 detects a person.

Figure 7:
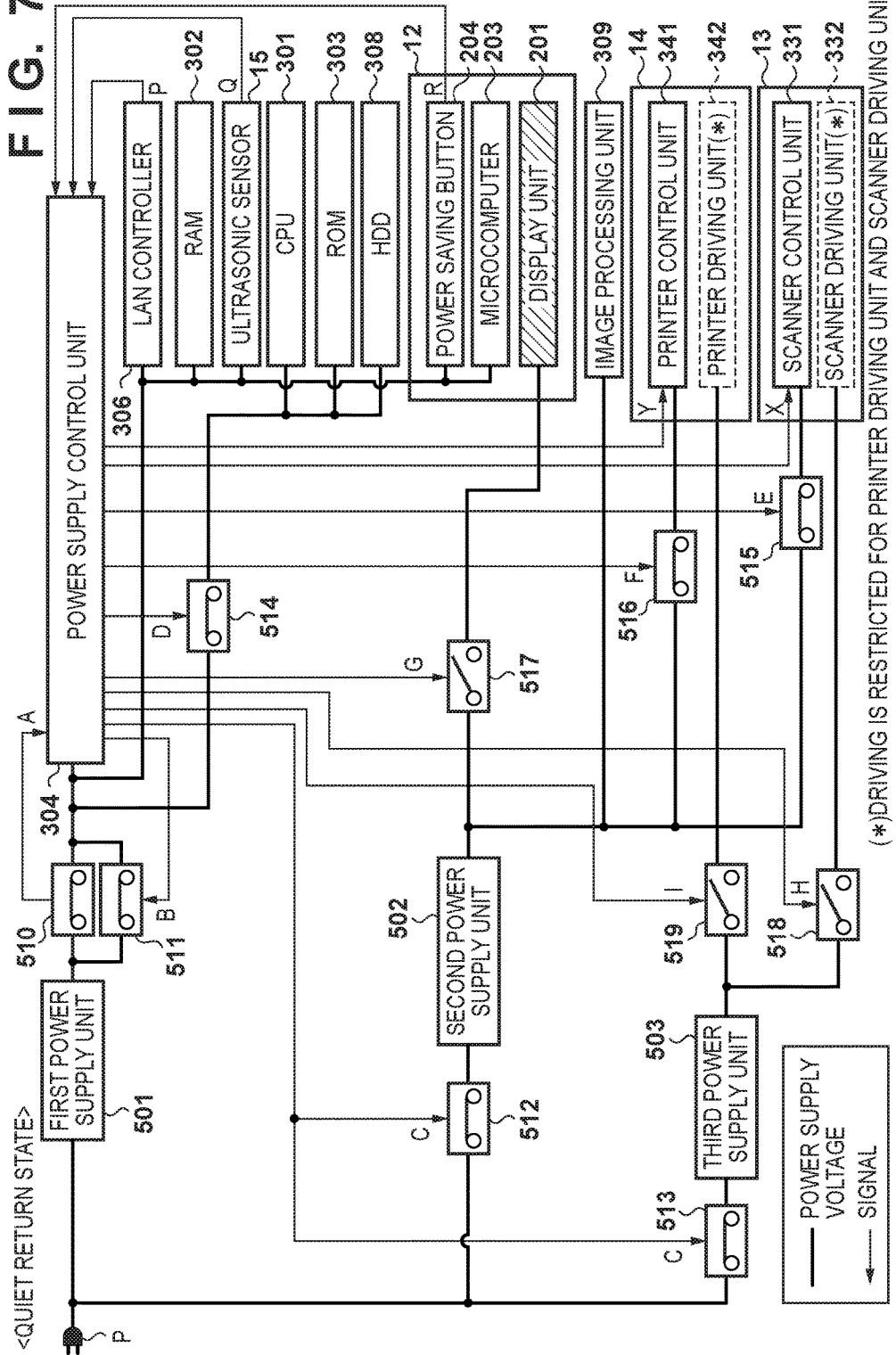
FIG. 7 is a diagram showing the quiet return state of the image forming apparatus according to the first embodiment.

FIG. 7 shows power control in the quiet return state ST3. As shown in FIG. 7, in the quiet return state ST3, power is supplied to the CPU 301, the HDD 308, the ROM 303, the image processing unit 309, the printer unit 14, and the scanner unit 13 in addition to the devices that receive power in the power saving state ST4. Note that the printer control unit 341 and the scanner control unit 331 respectively restrict the printer driving unit 342 and the scanner driving unit 332 from being driven.

Figure 8:
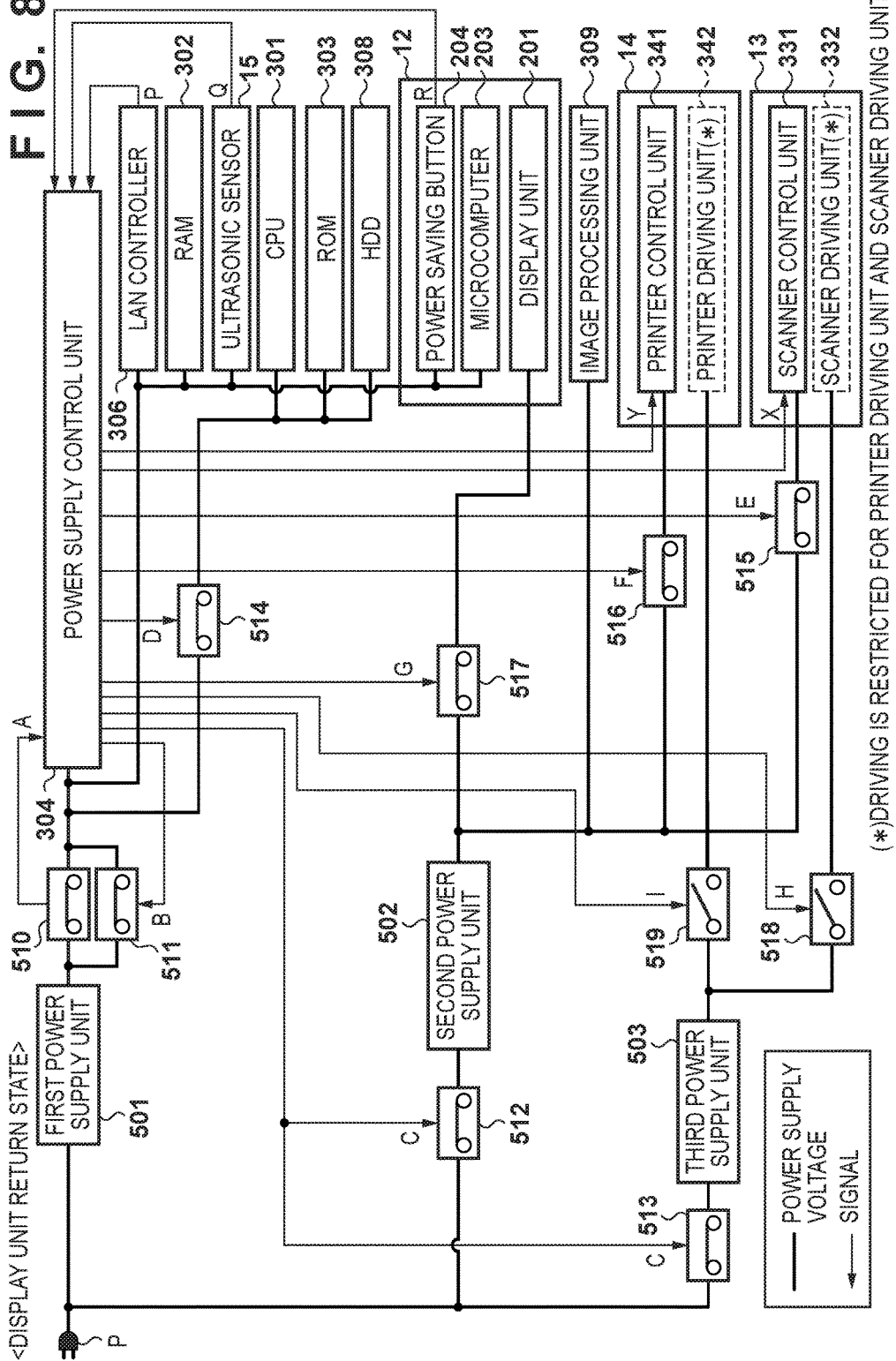
FIG. 8 is a diagram showing the display unit return state of the image forming apparatus according to the first embodiment.

FIG. 8 shows power control in the display unit return state ST2. As shown in FIG. 8, in the display unit return state ST2, power is supplied to the display unit 201 in addition to the devices that receive power in the quiet return state ST3. Thus, the display unit 201 can display various kinds of information. When an instruction is input via the display unit, the microcomputer 203 controls the switch 519 and switch 520 to be ON from OFF and cancels the driving restriction on the printer driving unit 342 and the scanner driving unit 332. Thus, it becomes possible to switch from the restricted supply of power to supply of power that allows normal operation of the printer driving unit 342 and the scanner driving unit 332.

<Operation Unit>

Figure 9:
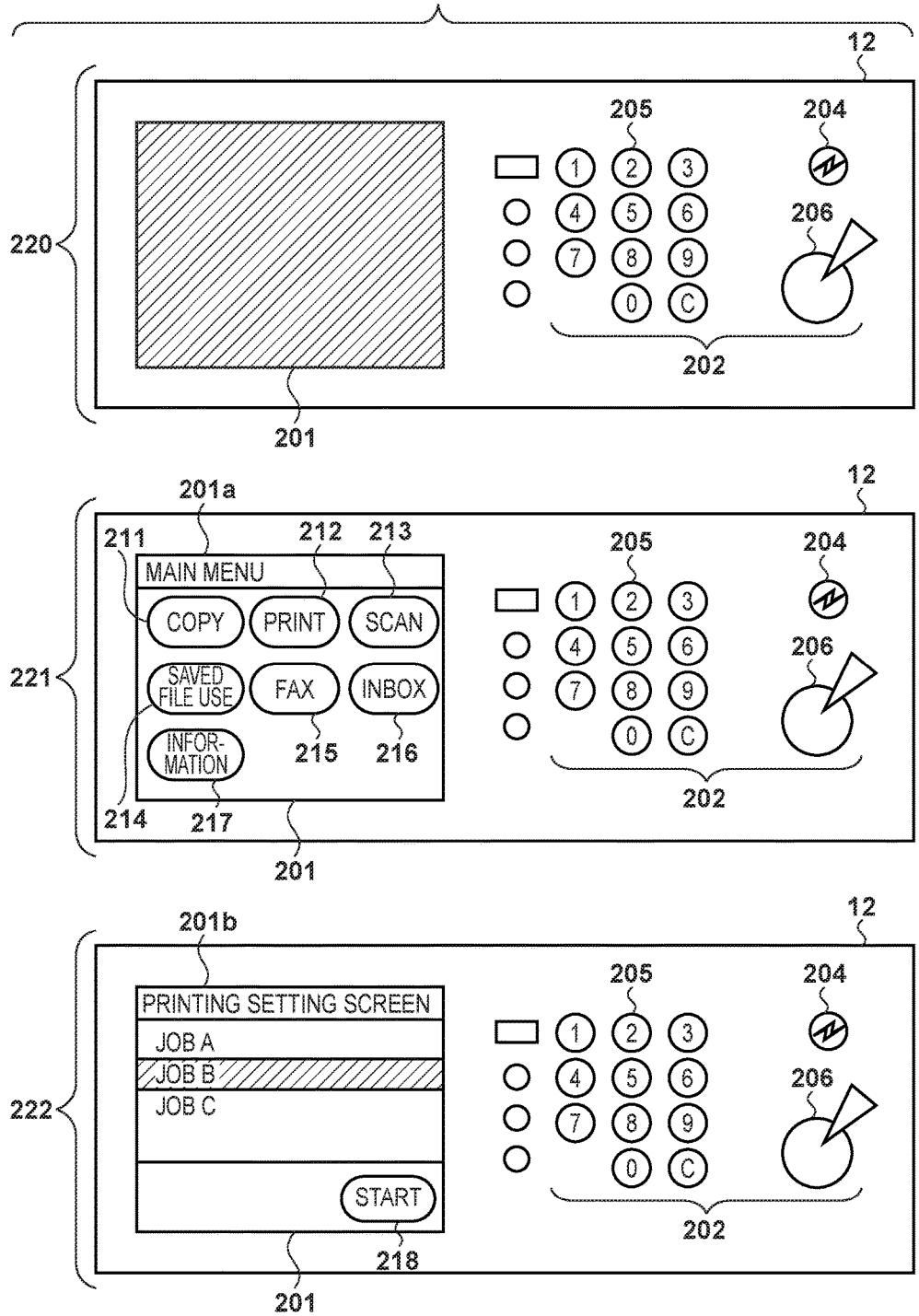
FIG. 9 shows detailed views of an operation unit according to the first embodiment.
Figure 12C:
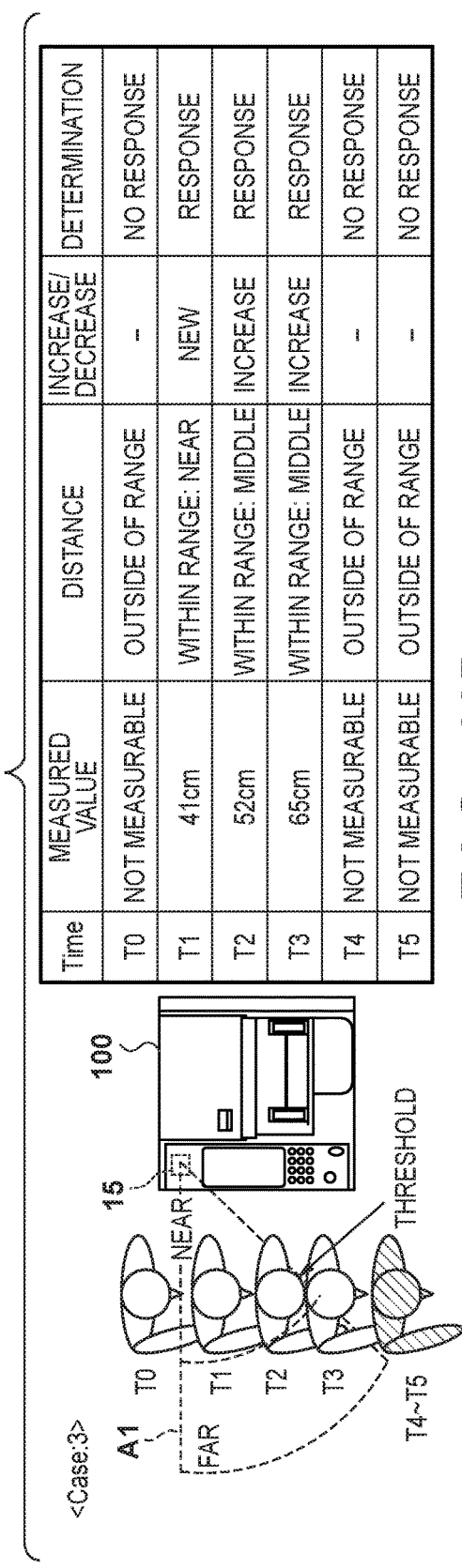
Figure 12D:
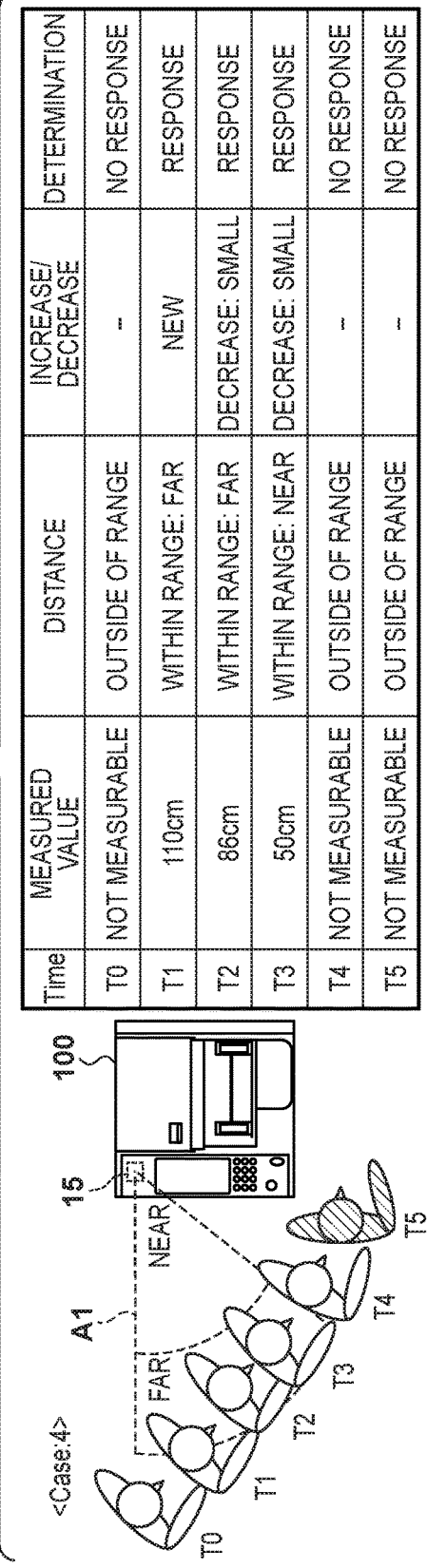

Details of the operation unit 12 will be described next with reference to FIG. 9. As shown in 220, the operation unit 12 includes the display unit 201, buttons 202, and the microcomputer 203 shown in FIG. 3. Note that while an example in which the microcomputer 203 is implemented in the operation unit 12 will be described, the present invention is not limited to this. The microcomputer 203 may be implemented in another component.

The display unit 201 displays various kinds of images. As shown in 221, the microcomputer 203 displays the main menu screen (the selection screen) 201a for selecting the copy function, the print function, the scan function, and the like on the display unit 201. Also, as shown in 222, the microcomputer 203 displays, on the display unit 201, a setting screen 201b for executing the function selected on the main menu screen 201a.

As shown in 220, in the power off state ST5, the power saving state ST4, and the quiet return state ST3, the display unit 201 changes to a non-display state in which no image is displayed. This non-display state may be a state in which an image to be displayed on the display unit 201 is rendered, but the backlight is OFF or a state in which the display unit 201 is OFF and no image is rendered on the display unit 201. In contrast, as shown in 221 and 222, a state in which a screen is displayed on the display unit 201 is called a display state.

As shown in 221, the main menu screen 201a contains a copy icon 211 for executing the copy function, a print icon 212 for executing the print function, and a scan icon 213 for executing the scanner function. The main menu screen 201a also contains saved file use icon 214 for using a file saved in the HDD 308, and a FAX icon 215 for executing the FAX function. The main menu screen 201a also contains an inbox icon 216 for checking received email, and an information icon 217 for displaying various kinds of information.

As shown in 222, the setting screen 201b contains a start button 218 for instructing the execution of a selected job. 222 shows a scene in which "JOB B" has been selected.

The buttons 202 include a start key 206 for instructing the execution of starting an operation such as copying or scanning. The buttons 202 also include the power saving button 204. If the power saving button 204 is pressed (operated) by the user when the image forming apparatus 100 is in the standby state ST1, the image forming apparatus can shift to the power saving state ST4. If the power saving button 204 is pressed by the user when the image forming apparatus 100 is in the power saving state ST4, the image forming apparatus 100 can shift to the standby state ST1. The buttons 202 also include a ten-key pad 205 for inputting a numerical value such as the number of copies to be printed.

<Power Control>

The power control transition according to the distance between the image forming apparatus 100 and an operator will be described next with reference to FIG. 10. In FIG. 10, 1001 shows the relationships concerning the distances between the image forming apparatus 100 and the operators, and 1002 shows power states of the image forming apparatus 100 when the operators are present in respective positions shown in 1001. In 1002, as the power state of the image forming apparatus 100, the total supplied power and the components to which power is supplied in the respective operational states are indicated.

As shown in 1011, in a state T1 when it is determined that no person is present within a detection range A1 of the ultrasonic sensor 15 or the person who entered the detection range A1 is a passerby, the image forming apparatus 100 stands by in the power saving state ST4. In this power saving state ST4, power supply is restricted to certain devices such as the ultrasonic sensor 15. More specifically, in the power saving state ST4, power is supplied to the LAN controller 306, the RAM 302, the ultrasonic sensor 15, the microcomputer 203, and the power saving button 204.

1012 indicates a state T2 in which the presence of a person is detected in the detection range A1 of the ultrasonic sensor 15. In 1012, however, power is only supplied to the controller 11 and the like since it is a state in which the person has not been determined as the operator. More specifically, in the state T2, power is supplied to the scanner unit 13, the printer unit 14, the image processing unit 309, the HDD 308, and the CPU 301 in addition to the devices that receive power in the power saving state ST4. Thus, activation of the controller 11, the scanner unit 13, and the printer 14 is started. Note that although the activation may start, since the scanner control unit 331 restricts the scanner driving unit 332 from being driven and the printer control unit 341 restricts the printer driving unit 342 from being driven, the activation starts in a state free from the driving noise of the printer driving unit 342.

Note that in this embodiment, at the point of the state T2, no power is supplied to the display unit 201 through which the operator uses the image forming apparatus 100. In the state T2, however, the power saving button 204 will blink or light up in order to guide a person intending to use the image forming apparatus 100 to the next operational portion.

1013 shows a state T3 in which the user who has come close to the image forming apparatus 100 presses the power saving button 204 or the person who falls within the range has been determined as the operator. In the state T3, power is supplied to the display unit 201 and the display unit 201 displays the screen. In this embodiment, since the operator presses the power saving button 204 with the intention of using the image forming apparatus 100, power is supplied to the display unit 201 at the timing when the power button 204 is pressed. When the power saving button 204 is pressed, the display unit 201 displays the main menu screen 201a for selecting a function (for example, the copy function, the print function, the scan function, the BOX function, and the FAX function) provided by the image forming apparatus 100.

1014 shows a state T4 in which the operator has selected a function on the main menu screen 201a. In state T4, power is supplied to portions necessary for executing the function. A case will be described in which the print icon 212 displayed on the main menu screen 201a is selected. When the print icon 212 is selected on the main menu screen 201a, the printer control unit 341 cancels the driving restriction on the printer driving unit 342.

<Processing Procedure>

Processing to be executed by the microcomputer 203 of the operation unit 12 will be described next with reference to FIG. 11. FIG. 11 shows a series of operations performed by the image forming apparatus 100 from the power saving state ST4 till its return to the standby state ST1. The processing to be described below is executed when the microcomputer 203 of the operation unit 12 executes a program.

First, the image forming apparatus 100 stands by in the power saving state ST4. In step S101, the microcomputer 203 determines whether a person is present in the detection range A1 of the ultrasonic sensor 15. The process advances to step S102 if a person is present. Otherwise, the process returns to the determination in step S101. More specifically, the microcomputer 203 receives, from the ultrasonic sensor 15, a signal output by the ultrasonic sensor 15 when a person is detected, and determines that a person has entered (is present in) the detection range A1 of the ultrasonic sensor 15. The entry of a person is not determined (S101: NO), however, if the distance between the ultrasonic sensor 15 and the person increases immediately after the start of the detection or if the person was detected only for a short period.

In step S102, when it is determined that a person is present in the detection range A1 of the ultrasonic sensor 15, the microcomputer 203 instructs the power supply control unit 304 to supply power to the CPU 301, the HDD 308, the image processing unit 309, the printer unit 14, and the scanner unit 13. More specifically, the signal Q is set at high level. The power supply control unit 304, having received the instruction, controls the logic of the signals C, D, E, F, G, H, and I so that power is supplied to the CPU 301, the HDD 308, the image processing unit 309, the printer unit 14, and the scanner unit 13. The CPU 301, the HDD 308, the image processing unit 309, the printer unit 14, and the scanner unit 13 supplied with power, start to activate. Note that at this point, no power is supplied to the display unit 201. In addition, at this point, due to the driving restriction on the printer driving unit 342 and the scanner driving unit 332, the above activation is free from the driving noise of the printer driving unit 342 and the scanner driving unit 332.

Subsequently, in step S103, the microcomputer 203 determines whether the detected person is the operator of the image forming apparatus 100 based on the transition of the distance measured by the ultrasonic sensor 15 for every predetermined time. The determination method will be described in detail later. If the person can be determined as the operator, the process advances to step S107 and the microcomputer 203 causes the display unit 201 to display a screen. Otherwise, the process advances to step S104 and the microcomputer 203 transits to the quiet return state ST3 without displaying the screen.

In the quiet return state ST3, the microcomputer 203 determines whether the power saving button 204 is pressed (operated) in step S104. If the power saving button 204 is not pressed, the process advances to step S105. Otherwise, the process advances to step S107. In step S105, the microcomputer 203 determines whether a predetermined time has passed without the power saving button 204 being pressed since detecting the presence of the person who falls within the detection range A1 in step S101. If the predetermined time has passed, the process advances to step S106. Otherwise, the process returns to step S104.

In step S106, the microcomputer 203 instructs the power supply control unit 304 to stop supplying power to the CPU 301, the HDD 308, the image processing unit 309, the printer unit 14, and the scanner unit 13. The power supply unit 304, having received the instruction, controls the logic of the signals C, D, E, F, G, H, and I so that power supply to the CPU 301, the HDD 308, the image processing unit 309, the printer unit 14, and the scanner unit 13 is stopped. Thus, the image forming apparatus 100 shifts to the power saving state ST4.

On the other hand, if it is determined that the power saving button 204 has been pressed, the process advances to step S107, and the microcomputer 203 causes the display unit 201 to display the main menu screen 201a. In step S108, the microcomputer 203 determines whether the user has selected the copy icon 211 on the displayed main menu screen 201a. If it is determined that the copy icon 211 is selected, the process advances to S109. Otherwise, the process advances to step S110. In step S109, the microcomputer 203 cancels the driving restriction on the printer driving unit 342 and the scanner driving unit 332 necessary for executing the copy function, thereby setting the standby state ST1 capable of executing the copy function.

On the other hand, in step S110, the microcomputer 203 determines whether the user has selected the print icon 212 on the main menu screen 201a. If the print icon 212 is selected, the process advances to step S111. Otherwise, the process advances to step S112. In step S111, the microcomputer 203 cancels the driving restriction on the printer driving unit 342 necessary for executing the print function, thereby setting the standby state ST1 capable of executing the print function.

On the other hand, in step S112, the microcomputer 203 determines whether the user has selected the scan icon 213 on the main menu screen 201a. If it is determined that the scan icon 213 is selected, the process advances to step S113. Otherwise, the process returns to step S104. In step S113, the microcomputer 203 cancels the driving restriction on the scanner driving unit 332 necessary for executing the scan function, thereby setting the standby state ST1 capable of executing the scan function.

Note that although the example has been described in which the copy icon 211, the print icon 212, and the scan icon 213 of the main menu screen 201a are selected, the same processing procedure will be applied if another icon is selected. If another icon is selected, power is supplied to a functional unit (for example, a FAX unit) necessary for executing the function corresponding to the selected other icon. For example, if the FAX icon 215 is selected on the main menu screen 201a, power is supplied to the scanner unit 13 necessary for transmitting a FAX.

<Determination Criteria of Person Detection>

Determination criteria of person detection (of a passerby and an operator) in steps S101 and S103 in FIG. 11 will be described next with reference to FIGS. 12A to 12D. Four case examples shown in FIGS. 12A to 12D will be used to explain how the microcomputer 203 of the operation unit 12 makes the determination between a passerby and an operator of the image forming apparatus 100 based on the transition of the distance measured by the ultrasonic sensor 15 for every predetermined time. FIGS. 12A to 12D show the transition of the distance between the image forming apparatus 100 and the person for every predetermined time. For each case in FIGS. 12A to 12D, distances between the image forming apparatus 100 and the operators are illustrated on the left portion, and each measured distance and the corresponding determination of the image forming apparatus 100 are indicated in a table on the right portion. In addition, the item "distance" for each table is defined by dividing the detection start position into three-steps of "far", "middle", and "near" within the detection range A1.

<Case: 1>

Case 1 shows a case in which a person directly heads toward the image forming apparatus 100 and comes close to the apparatus. The microcomputer 203 of the operation unit 12 determines that an object has been detected in the "far" area within the detection range A1 at the point of T1. Subsequently, the microcomputer 203 determines that a person is present in the detection range A1 (YES in step S101 of FIG. 11) since the measured distance has decreased in T2 from the measurement result of T1. Further, as the distance continues to decrease from T1 to T4, the person who continues to come close to the image forming apparatus 100 is determined as the operator (YES in step S103 of FIG. 11).

<Case: 2>

Case 2 shows a case in which a person comes close from a near distance to use the image forming apparatus 100. The microcomputer 203 of the operation unit 12 determines that an object has been detected in the "near" area within the detection range A1 at the point of T1. Since the distance from the object becomes shorter at the point of T2, the microcomputer 203 determines that a person is present (YES in step S101 of FIG. 11). However, since there is no increase/decrease (variation) in the distance from T2 to T4, the microcomputer 203 cannot determine whether the person is present in the detection range A1 with the purpose to use the image forming apparatus 100. Hence, operator determination is not made until T4. When the person is continuously detected in the "near" area up to T5 after a predetermined time has passed, the detected person is determined as the operator of the image forming apparatus 100 (YES in step S103 of FIG. 11). Consequently, in this case, the operator is made to wait until the time passes in T3 and T4. In such a case like this, the power saving button can be pressed (step S104 of FIG. 11) to display the screen (step S107 of FIG. 11).

<Case: 3>

Case 3 shows a case in which a person passes in front of the image forming apparatus 100. The microcomputer 203 of the operation unit 12 determines that an object has been detected in the "near" area within the detection range A1 at the point of T1. However, at the point of T2, since the distance immediately increases, it is determined that no person is present (NO in step S101 of FIG. 11). The distance also increases at T3, and the ultrasonic sensor 15 loses the response at T4 and T5 (NO in step S101 of FIG. 11).

<Case: 4>

Case 4 shows a case in which a person accesses a space next to the image forming apparatus 100. The microcomputer 203 of the operation unit 12 determines that an object has been detected in the "far" area within the detection range A1 at the point of T1. Next, at points of T2 and T3, the microcomputer 203 confirms, in addition to decreasing of the measured distance, the rate of the decrease of the distance. If the rate of the decrease of the distance is small, it is determined that no person is present. When a person accesses a space next to the main body such as in this case, since the person will diagonally pass in front of the image forming apparatus 100, the rate of the decrease of the distance becomes smaller than in the aforementioned Case 1. The microcomputer 203 of the operation unit 12 determines the magnitude of this rate of the decrease and determines not to detect the object as a person. Subsequently, at the points of T4 and T5, the ultrasonic sensor 15 loses the response (NO in step S101 of FIG. 11) since the person has moved outside the detection range A1.

With the above-described determination criteria, an interval for measuring a person's action for every predetermined time for T0, T1, T2, . . . , and a time till it is detected that person is present within the detection range A1 (parameters for person/operator determination criteria) can be set. These setting values can become factors which make the operator feel, for example, that the return from the power saving state is fast/slow or that there are many/few erroneous returns. This also applies to setting a time to determine that an operator is present based on the presence of a person, over a predetermined time such as in Case 2, in front of the image forming apparatus 100. For example, if the image forming apparatus 100 is installed standalone and will only be visited by the operator, it is desirable to cause the apparatus to return as soon as a person comes. If the image forming apparatus 100 is installed on the side of a path, in order to prevent a detection error when a person comes, it is desirable not to detect the person for a certain time after the person has come within the detection range A1. It is desirable for these setting values (the parameters for person/operator determination criteria) to be arbitrarily set in consideration of the installation environment of the image forming apparatus 100, the specifications of the apparatus, and the like. Thus, the operation unit 12 may display a menu to adjust these setting values and allow the setting values to be changed according to user input.

<Processing Procedure of Person Detection>

Figure 13:
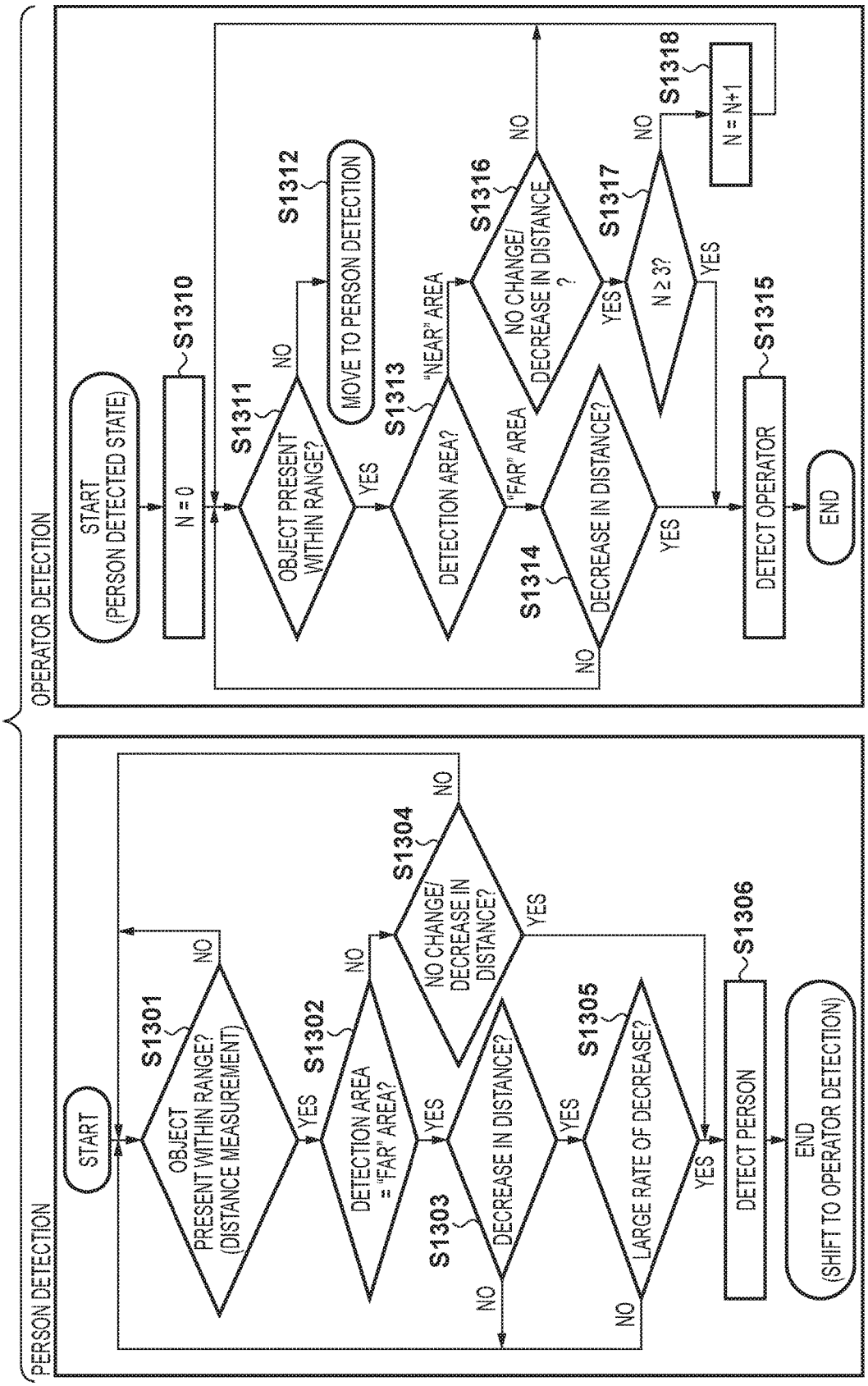
FIG. 13 shows a flowchart of a person detection sequence and a flowchart of an operator detection sequence, respectively, of the image forming apparatus according to the first embodiment.

Processing procedure for the determination of person detection (person determination) by the microcomputer 203 of the operation unit 12 described in FIGS. 12A to 12D will be explained next with reference to the flowchart of FIG. 13. The processing to be described below is executed by the microcomputer 203 for each periodic measurement of the distance after an object is detected. The microcomputer 203 can measure the distance to the object present in the detection range A1 for every predetermined time, store the distance data for every predetermined time, and compare the latest measured distance with past measured distances.

First, in step S1301, the microcomputer 203 measures the distance to an object by using the ultrasonic sensor 15 in order to determine whether the object is present in the detection range A1. After the distance is measured, the process advances to step S1302, and the microcomputer 203 determines whether the object measured in step S1301 is present in the "far" area of the detection range A1. If the object is present in the "far" area, the process advances to step S1303. Otherwise, the process advances to step S1304. In step S1303, the microcomputer 203 compares current and previous measured distances to determine whether the distance is decreasing. In other words, it is determined whether the detected object is coming close to the image forming apparatus 100.

If the previous distance measurement result was not measurable, it is determined that the distance has not decreased. If the distance has not decreased, the process returns to step S1301. If the distance has decreased, the process advances to step S1305, and the microcomputer 203 determines whether the magnitude of the rate of the decrease is large, that is, more than a predetermined threshold. If the decrease is large (more than a predetermined threshold), the process advances to step S1306. Otherwise, the process returns to step S1301. Person detection is stopped in step S1305 if a person comes close the image forming apparatus 100 diagonally as in Case 4 of FIG. 12D. On the other hand, if the rate of the decrease is large, the process advances to step S1306, and the microcomputer 203 detects the object as a person.

If it is determined in step S1302 that the object is present in the "near" area, the microcomputer 203 determines, in step S1304, whether the distance has decreased/not changed from the previous measured distance, or if it is otherwise. If there is no change or the distance has decreased, the process advances to step S1306. Otherwise, the process returns to step S1301. In step S1306, the microcomputer 203 detects the object as a person. After the object is detected as a person, the process advances to determine whether the person is an operator. Also, if the object is detected as a person, the image forming apparatus 100 transits from the power saving state ST4 to the quiet return state ST3 as shown in FIG. 10.

The procedure of detecting whether the person detected as a person is the operator (operator determination) will be described next. First, in step S1310, the microcomputer 203 initializes (N=0) a variable N stored in the microcomputer 203. Next, in step S1311, the microcomputer 203 determines whether there is an object which falls within the range. If no object is present, the process shifts in step S1312 to the object detection in step S1301. If an object is present, the process advances to step S1313, and the microcomputer 203 determines the area of the detection range A1 in which the person is detected. If the person is detected in the "far" area, the process advances to step S1314, and the microcomputer 203 determines whether the distance is decreasing. If the distance is decreasing, the process advances to step S1315, and the microcomputer 203 determines the person to be the operator and ends the process. On the other hand, if the detection range is in the "near" area in step S1313, the process advances to step S1316, and the microcomputer 203 determines whether the distance has decreased/not changed or if it is otherwise. If the distances has decreased/not changed, the process advances to step S1317, and the microcomputer 203 determines whether the value of the variable N is equal to or more than 3 (equal to or more than a predetermined number of times). If the variable N is less than 3, the process advances to step S1318, and the microcomputer 203 increments the variable N by 1 and the process returns to step S1311. On the other hand, if the variable N is equal to or more than 3, the process advances to step S1315, and the microcomputer 203 detects the person as an operator. After it changes to a person detection state, unless the person is detected in the "near" area for a predetermined number of times (3 in this example), he/she is not detected as the operator. This corresponds to the control of determining the person as an operator when the operator has been detected over a predetermined time such as in Case 2 of FIG. 12B. Other determination criteria may be applied to the present invention, as a matter of course.

Second Embodiment

The second embodiment of the present invention will be described below with reference to FIG. 14. The above-described first embodiment described an example in which the display unit 201 displays a screen at the timing when the power saving button 204 is pressed. However, the present invention is not limited to this. In this embodiment, a capacitance sensor 250 incorporated in an operation unit 12 detects that the hand of the operator has been put over the proximity of the operation unit 12, and a main menu screen 201a is displayed on the display unit 201. Note that, in this embodiment, the capacitance sensor 250 may be further provided in addition to the ultrasonic sensor 15 in the above-described first embodiment. In the following description, only control and arrangements that differ from the above-described first embodiment will be described.

FIG. 14 shows a person putting a hand over the display unit 201 of an image forming apparatus 100 according to this embodiment. As shown in FIG. 14, the operation unit 12 according to the embodiment is provided with the capacitance sensor (antenna) 250. This capacitance sensor 250 detects a person who comes close to the apparatus in accordance with the capacitance of a capacitor arranged between the hand of the person coming close to the operation unit 12 and the capacitance sensor 250. More specifically, when the capacitance is equal to or more than a predetermined amount, the microcomputer 203 determines that a hand has been put over the operation unit and determines the detected person as the operator. When the hand of the person enters a detection range A2 of the capacitance sensor 250, power is supplied to the display unit 201, and the main menu screen 201a is displayed on the display unit 201.

<Modification>

The present invention is not limited to the above-described embodiments, and various modifications are possible. For example, although an example using the ultrasonic sensor 15 was described in the first embodiment, a camera may be used instead of the ultrasonic sensor 15. In addition, the camera need not only be a camera provided in the image forming apparatus 100. A camera provided in the room where the image forming apparatus 100 is installed, that is, a camera (for example, a surveillance camera) provided in a position apart from the main body of the image forming apparatus 100 may be used. Also, although an example in which the main menu screen 201a is displayed on the display unit 201 by using the capacitance sensor was described, a touch panel sensor of the display unit 201 may be used instead of the capacitance sensor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A data processing apparatus, comprising:
    a human sensor;
    a first controller which determines whether or not an approaching amount of a human toward the data processing apparatus in a predetermined period is larger than a threshold value based on an output of the human sensor; and
    a power controller which shifts the data processing apparatus from a first power state to a second power state in which power consumption is higher than power consumption in the first power state based on a determination result that the first controller determines that the approaching amount of a human toward the data processing apparatus in the predetermined period is larger than the threshold value.

2. The apparatus according to claim 1, further comprising a second controller which controls the data processing apparatus, wherein a power supply to the second controller is stopped in the first power state and the power supply to the second controller is not stopped in the second power state.

3. The apparatus according to claim 1, further comprising a display, wherein a power supply to the display is stopped in both the first power state and the second power state.

4. The apparatus according to claim 3, wherein the power controller further shifts the data processing apparatus from the second power state to a third power state in which the display lights up based on a determination result that the first controller determines that a human exists in a predetermined area.

5. The apparatus according to claim 4, wherein the first controller determines whether or not a human exists in a predetermined area continuously for a predetermined period based on the output of the human sensor, and the power controller further shifts the data processing apparatus from the second power state to the third power state based on a determination result that the first controller determines that a human exists in the predetermined area continuously for the predetermined period.

6. The apparatus according to claim 3, further comprising a button which receives a user operation,
    wherein the power controller further shifts the data processing apparatus from the second power state to a third power in which the display lights up in a case where the button accepts the user operation.

7. The apparatus according to claim 1, further comprising a printing unit, wherein the power controller shifts the data processing apparatus from the first power state to the second power state and restricts drive of the printing unit, based on a determination result that the first controller determines that the approaching amount of a human toward the data processing apparatus in the predetermined period is larger than the threshold value.

8. The apparatus according to claim 7, wherein the power controller cancels a restriction of the drive in a case where a screen displayed on a display is operated.

9. The apparatus according to claim 1, wherein the first controller determines whether or not a human exists in a predetermined area based on the output of the human sensor, and the power controller further shifts the data processing apparatus from the first power state to the second power state based on a determination result that the first controller determines that a human exists in the predetermined area.

10. A data processing apparatus, comprising:
    a human sensor;
    a first controller which computes a first value corresponding to a distance between a human and the data processing apparatus at a first time based on output from the human sensor, a second value corresponding to a distance between a human and the data processing apparatus at a second time which is later than the first time based on output from the human sensor, and a change amount of a distance in a first time period between the first time and the second time based on the first value and the second value; and
    a power controller which changes a power state of the data processing apparatus based on the change amount.

11. The apparatus according to claim 10, wherein the power controller shifts the data processing apparatus from a first power state to a second power state in which power consumption is higher than power consumption in the first power state based on a determination result that the first controller determines that a decrease amount of the distance in the first time period is larger than a threshold value.

12. The apparatus according to claim 11, further comprising a second controller which controls the data processing apparatus,
    wherein a power supply to the second controller is stopped in the first power state and the power supply to the second controller is not stopped in the second power state.

13. The apparatus according to claim 11, further comprising a display, wherein a power supply to the display is stopped in both the first power state and the second power state.

14. The apparatus according to claim 13, wherein the first controller further computes a third value corresponding to a distance between a human and the data processing apparatus at a third time based on output from the human sensor, and a change amount of a distance in a second time period between the second time and the third time based on the second value and the third value, and wherein the power controller further shifts the data processing apparatus from the second power state to a third power state in which the display lights up based on a determination result that the first controller determines that the decrease amount of the distance in the second time period is larger than the threshold value.

15. The apparatus according to claim 14, wherein the first controller determines whether or not a human exists in a predetermined area continuously for a predetermined period, and the power controller further shifts the data processing apparatus from the second power state to the third power state based on a determination result that the first controller determines that a human exists in the predetermined area continuously for the predetermined period.

16. The apparatus according to claim 13, further comprising:

a button which receives a user operation, wherein the power controller further shifts the data processing apparatus from the second power state to a third power state in which the display lights up in a case where the button accepts the user operation.

17. The apparatus according to claim 11, further comprising a printing unit, wherein the power controller shifts the data processing apparatus from the first power state to the second power state and restricts drive of the printing unit, based on a determination result that the first controller determines that the decrease amount of the distance in the first time period is larger than the threshold value.

18. The apparatus according to claim 17, wherein the power controller cancels a restriction of the drive in a case where a screen displayed on a display is operated.

19. The apparatus according to claim 11, wherein the first controller determines whether or not a human exists in a predetermined area based on an output of the human sensor, and the power controller further shifts the data processing apparatus from the first power state to the second power state based on a determination result that the first controller determines that a human exists in the predetermined area.

* * * * *